Patented Apr. 21, 1953

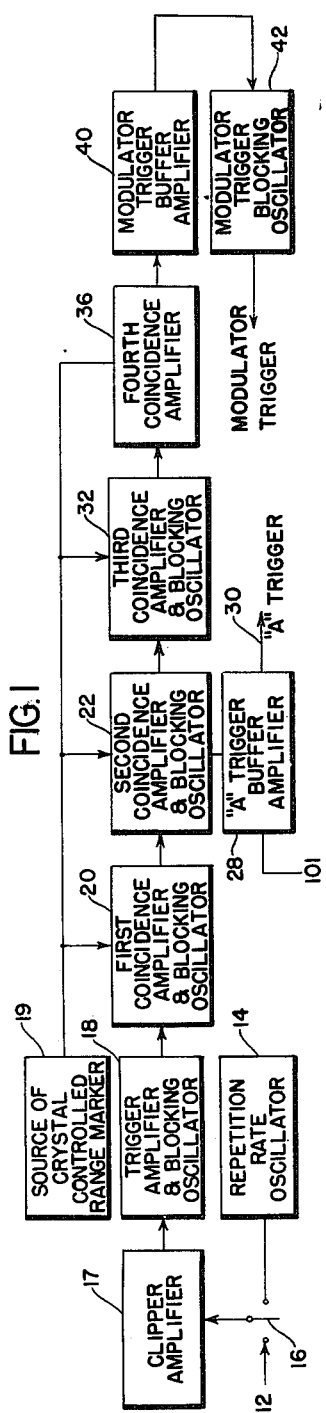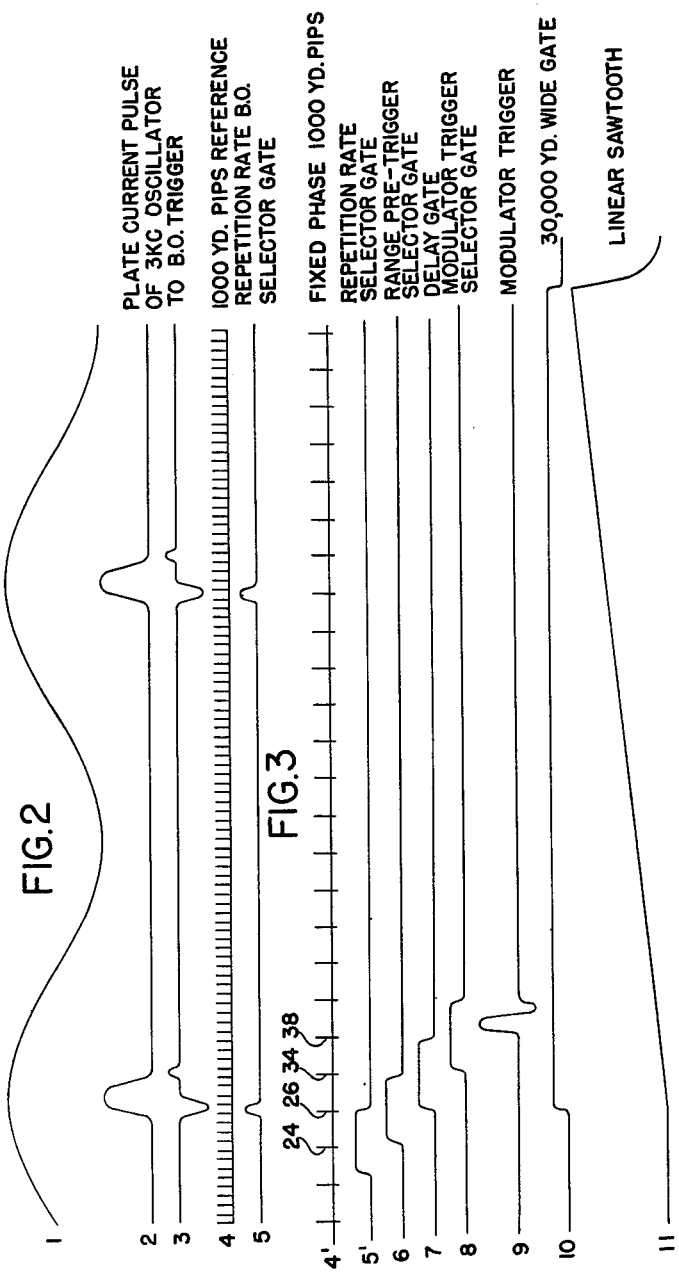

2,636,165

UNITED STATES PATENT OFFICE 2,636,165

TRIGGERING SYSTEM

Robert I. Hulsizer, Belmont, and George Hite, Dorchester, Mass., assignors, by mesne assignments, to the United States of America as represented by the Secretary of the Navy Application September 14, 1945, Serial No. 616,402

7 Claims. (Cl. 343—5)

This invention relates to radio pulse-echo ranging, particularly by means of non-synchronous pulses, and relates more especially to the provision of accurate range marks for the same.

In certain types of radio pulse-echo installations, particularly where several are operated in the vicinity of one another, non-synchronized triggering sources are highly desirable. If synchronized sources are used, even if the pulse repetition frequencies are slightly different, the main pulses will move across the indicator screens, confusing the screen patterns, and disrupting automatic tracking. It is accordingly desirable to use non-synchronized pulses in which the intervals between successive main "bangs" or transmission pulses from each transmitter have slight variations or irregularities.

However, this introduces difficulty in producing accurate range marks. These are pips preferably developed from a crystal controlled oscillator, and it is readily apparent that the range marks will not be useful nor correct unless they begin with the main bang. This poses the problem of locking or accurately timing the crystal controlled marker pips with the non-synchronous transmission pulses.

In the present invention this problem is solved by shifting the main bang to coincide with one of the marker pips. More specifically, the pulse repetition frequency is used to generate a series of short gate pulses, and these gate pulses and also the marker pips are fed to a coincidence circuit to generate a synchronizing trigger which is coincident with one of the marker pips. This arrangement in itself helps cause some of the desired variation or irregularity in the spacing between the main bangs, yet each main bang is itself coincident with one of the marker pips.

A further object of the invention is to provide a series of triggers for different parts of the complete apparatus, and a related object is to trigger the sweep of a cathode ray oscilloscope of the "A" type ahead of the triggering of the main bang, thereby allowing for delay in starting of the sweep circuit, so that there will be accurate ranging even close to the apparatus.

To accomplish the foregoing general objects and other more specific objects which will hereinafter appear, the invention resides in the method and circuit elements and their relation one to another as are hereinafter more particularly described in the specification, and sought to be defined in the claims. The specification is accompanied by drawings in which:

Fig. 1 is a block diagram for one form of the invention;

Fig. 2 shows several wave forms explanatory of the invention;

Fig. 3 shows some of the wave forms on an expanded scale, and is further explanatory of the invention.

Figure 4:
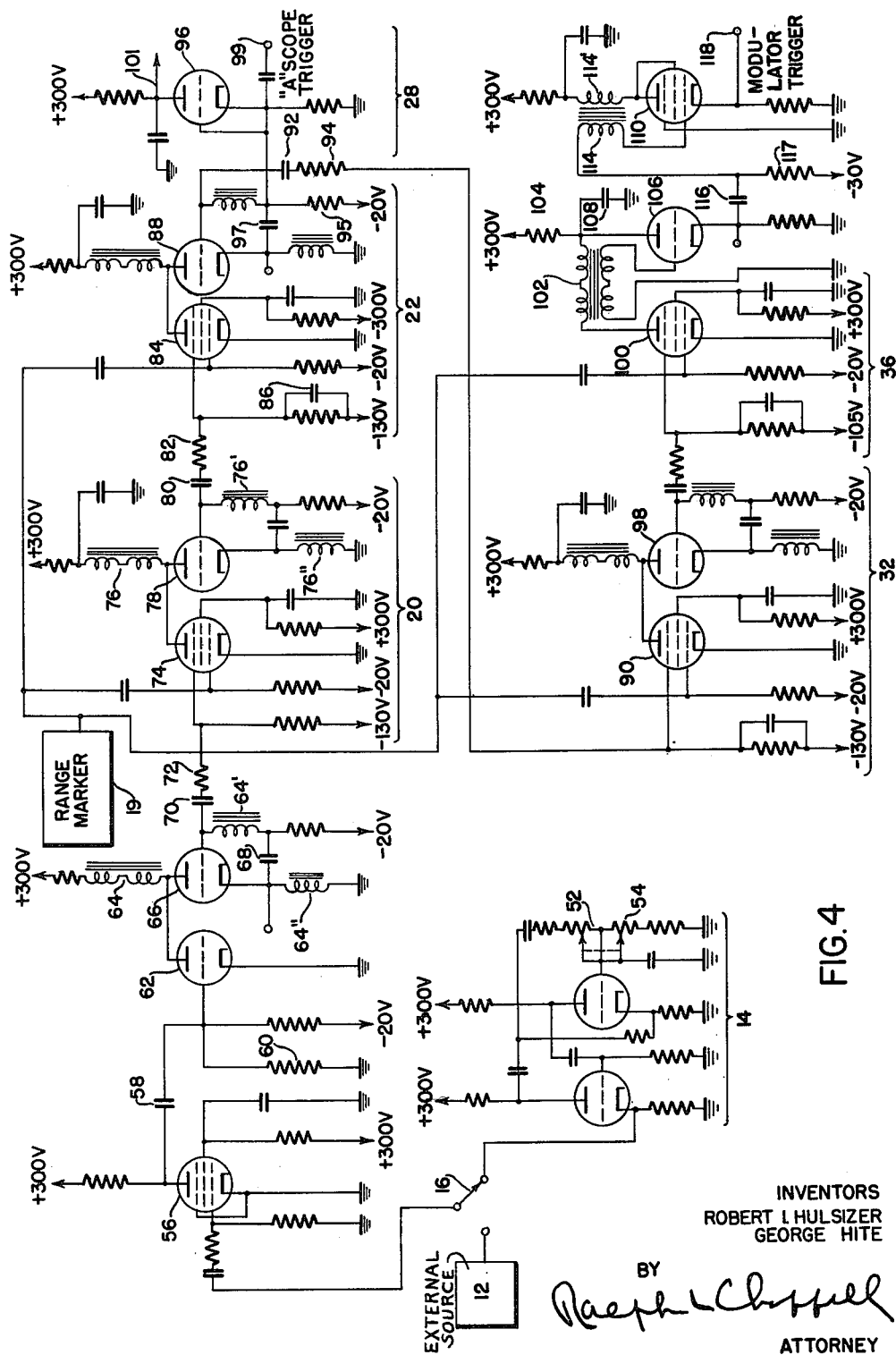
Fig. 4 is a wiring diagram for the circuit of Fig. 1.

Referring to the drawings, and more particularly to Figs. 1 and 2, the pulse repetition frequency (as an average frequency) is determined by either an external source 12, or a local oscillator 14 such as a Wien bridge oscillator, the selection of either source being made by means of a switch 16. The pulse repetition frequency is indicated by the curve of sine wave 1 (Fig. 2), and the plate current may be in the form of shortened pulses shown by curve 2 (Fig. 2). This is supplied to a clipper amplifier 17 (Fig. 1) which provides a trigger shown in curve 3 (Fig. 2) which is supplied to a trigger amplifier and blocking oscillator, indicated at 18 in Fig. 1. The blocking oscillator produces fairly wide pulses or short gates of known length (say 8 microseconds) for each trigger pulse, and these gate pulses are indicated in curve 5 (Fig. 2).

The range marks are controlled by a crystal oscillator the output of which is clipped to provide range pips which are fed to a first coincidence circuit and blocking oscillator circuit shown at 20 (Fig. 1). The crystal oscillator and associated circuits are indicated at 19 in Fig. 1. There are a considerable number of marker pips for each transmission pulse, and these are indicated by curve 4 (Fig. 2). The frequency of the crystal oscillator may for convenience be made 163.880 kilocycles, so that each range mark will correspond to 1000 yards of range.

In Fig. 3 the pips 4' correspond to the range mark pips 4 in Fig. 2 but are shown to an expanded scale. Similarly, the gate 5' corresponds to the repetition frequency gate pulses shown at 5 in Fig. 2, but are drawn to expanded scale. It is important to notice that there is no fixed phase relationship between the pips 4' and the gates 5'.

The coincidence circuit 20 (Fig. 1) will not respond to either a range mark pip alone, nor to a gate pulse alone, but will respond to their sum, that is, when they are coincidentally positive, and this produces a trigger at the range mark pip 24 (Fig. 3). The gate may be called a "selector gate" because it selects the particular range mark pip which will act as a trigger.

Box 20 in Fig. 1 includes a blocking oscillator as well as a coincidence circuit, and therefore the output is another short gate, shown as curve 6 in Fig. 3, but this gate has its rise synchronized or phase-locked with the range pip 24.

Reverting to Fig. 1, the selector gate is fed from the first coincidence amplifier and blocking oscillator 20 to a second coincidence amplifier and blocking oscillator 22. This is also supplied with the range mark pips, and functions like the unit 20 previously described. The result is to produce a second selector gate shown as curve 7 in Fig. 3, this being similar to the selector gate 6 but phase locked with the next range pip 26, instead of with range pips 24. The output of the unit 22 (Fig. 1) is supplied to a buffer amplifier 28 (Fig. 1) which in turn supplies the trigger for the sweep of the "A" type oscilloscope, as indicated at 30. More specifically, the trigger in question initiates a wide gate (30,000 yards for the particular equipment here employed), this being shown as curve 10 in Fig. 3. This also initiates the linear saw tooth wave for the sweep, the latter being indicated by curve 11 in Fig. 3.

Reverting now to Fig. 1, the selector gate from the second unit is supplied to a third coincidence amplifier and blocking oscillator 32 which is also supplied with range mark pips, thus producing a selector gate similar to that previously described but phase locked with the next range mark pip. The selector gate in question is shown by curve 8 in Fig. 3 and is phase locked with range mark pip 34.

Again referring to Fig. 1 the selector gate from the third unit is fed to a fourth coincidence amplifier 36, which is also fed with range marks from the crystal controlled source 19. The output circuit in this case is modified in a manner later described, with a view to obtaining a trigger suitable to fire the main bang. This trigger is phase locked with the next range pip 38, as will be seen in curve 9 of Fig. 3. The output of the fourth unit is supplied to a buffer amplifier 40 (Fig. 1) and thence to a blocking oscillator 42, the output of which is used as a modulator trigger.

The second coincidence amplifier and blocking oscillator unit is employed before starting the sweep of the "A" oscilloscope in order to avoid a slight inaccuracy or "jitter" in the first unit, this refinement being explained later in greater detail.

The reason the third and fourth coincidence amplifier units are employed is to delay the firing of the main bang after the starting of the sweep of the "A" oscilloscope. This is desirable because of the high inertia of the sweep circuits. By displacing the main bang from the center of the screen to a point slightly to the side, the range indication will be accurate for targets close to the transmitter as well as far away. If less delay is needed a third unit may be used alone, instead of both a third and fourth unit.

The circuit is shown in greater detail in Fig. 4, and referring to that figure, the particular internal pulse repetition frequency oscillator 14 here illustrated is a Wien bridge oscillator. It consists of two stages of resistance coupled amplification, with the output of the second stage fed back to the first stage as both negative and positive feedback. The frequency of oscillation is determined primarily by the RC network (the Wien bridge) in the grid and cathode circuits of the first stage. Some of the resistance elements in this network, specifically resistors 52 and 54, are made variable. The amount of variation obtainable is sufficient to vary the frequency of oscillation plus and minus, say five percent, of a nominal frequency of oscillation, which in this case is 3000 cycles per second. The output of this stage is fed to the switch 16.

The input to the clipper amplifier tube 56 is either the output of the illustrated oscillator 14, or other suitable internal pulse repetition frequency oscillator, or the ship's synchronizing signal supplied at 12, depending upon the position of the switch 16. The clipper amplifier 56, a pentode with zero bias, is designed to clip both the positive and negative portions of the incoming wave and so produce a square wave at the plate.

The square wave is fed through a low time constant circuit, consisting of condenser 58 and resistor 60, where it is peaked. This peaked wave is used to trigger the pulse repetition frequency trigger amplifier tube 62, which in turn triggers the blocking oscillator 66. The peaked wave is fed to the grid of the tube 62, and since the grid return of this tube is to minus 20 volts, the tube is normally cut-off. When the positive portion of the incoming peaked wave drives the grid above cut-off, plate current flows through the winding 64 (of transformer 64, 64', 64") in the plate circuit of tube 66. Since the grid of tube 66, the blocking oscillator, is also returned to minus 20 volts the equilibrium condition for this tube is also that it be cut off.

When the current from tube 62 begins to flow through the plate winding of tube 66, voltages are induced in the grid and cathode windings 64', 64" of the transformer. The voltage induced in the cathode winding 64" has a polarity such that the cathode potential goes positive with respect to ground. The voltage induced in the grid winding 64' has the polarity such that the grid end of this winding goes positive with respect to the end returned through condenser 68 to the cathode. The voltages thus induced are sufficient to raise the grid potential above cut-off and so cause additional current to flow through the plate winding. This process produces a regenerative action that continues until further increase in the grid potential no longer increases the plate current through the tube. When this condition is reached, the induced voltage in both the grid and cathode windings drops to zero, and so the tube tends to resume its quiescent cut-off condition.

However, as soon as the plate current begins to decrease, the field in the transformer core, which was caused by the plate current flowing through it, collapses so that voltages of opposite polarity are induced in the other windings. This is the second factor tending to drive the tube rapidly to cut-off.

A third factor tending to drive the tube to cut-off is the charge built up on condenser 68 during the time that the grid conducts. This charge causes the grid to drop below cut-off as soon as the plate current begins to decrease.

The entire cycle of driving the grid potential from below cut-off to conduction and back below cut-off occupies a time interval of about 8 microseconds. During this time, the grid potential is driven from about minus 20 volts to about plus 125 volts with respect to ground, and then below minus 20 volts.

The output from tube 66 is taken from the grid, and is fed to the first reference coincidence amplifier tube 74 through capacitor 70 and resistor 72.

The first reference coincidence amplifier tube 74 is a pentode. Two inputs are applied simultaneously to this tube, one to the suppressor grid and one to the control grid. The returns of both these grids are to negative potentials, so that they can separately cut off the flow of plate current. Therefore only the simultaneous application or coincidence of positive signals to both grids will cause the flow of plate current. The input to the control grid is the series of positive, 1000-yd. reference markers from the crystal controlled marker circuit 19, while the input to the suppressor grid is the gate from the pulse repetition frequency blocking oscillator tube 66.

The output voltage from the plate of the coincidence amplifier 74 is independent of the suppressor voltage over the range of voltages from minus 20 to plus 130 volts. However, since possibly coincidence may occur while the suppressor potential is between minus 75 and minus 20 volts, the output wave will vary somewhat in amplitude in the event of coincidence during this suppressor voltage range. The plate current that flows as a result of coincidence between the gate and the reference markers flows through the plate winding of transformer 76, 76', 76" in the plate circuit of tube 78, the first reference blocking oscillator. For this reason, the first reference coincidence amplifier 74 may be considered as a trigger amplifier for the blocking oscillator 78 which follows it.

The first reference blocking oscillator tube 78 is connected in the same manner as tube 66 and performs in exactly the same way. It should be noted that the delay between the application of the trigger to this type of blocking oscillator, and the beginning of the regenerative action, is dependent on the amplitude of the triggering current. Since, as has been previously noted, the amplitude of the triggering current may vary somewhat, the leading edge of the resulting gate taken from the grid may vary in time by as much as one microsecond with respect to the applied trigger, which is exactly synchronized with one of the 1000-yd. reference markers. To eliminate this jitter we employ another coincidence amplifier, as explained below, the output from the grid being applied to the same through capacitor 80 and resistor 82.

The second reference coincidence amplifier 84 is connected in the same manner as tube 74, except that the gate applied to the grid is taken from tube 78. It was stated in the preceding paragraph that this gate may vary (jitter) in time with respect to the 1000-yd. reference markers. However, since the gate has a width of 8 microseconds, coincidence will always occur during the time that the gate voltage is above minus 20 volts. The gate will be coincident with the marker that immediately follows the one causing coincidence in the first reference coincidence amplifier. This is insured by capacitor 86 in the suppressor grid circuit, which slopes the edges of the applied square wave so that the coincidence cannot occur with the preceding marker. The output of the second reference coincidence amplifier is exactly synchronized with the second reference marker, and is fed directly to the plate of tube 88.

This is a second reference blocking oscillator, and is connected in the same manner as the first reference blocking oscillator 78, and operates in the same way. Since the input to the plate has a constant amplitude, there will be a constant delay between the trigger and the leading edge of the output gate. The output gate is taken from the grid of tube 88 and fed to the third reference coincidence amplifier tube 90 through capacitor 92 and resistor 94. A second output is taken from the cathode end of the grid winding of the transformer and is fed through a parallel R. C. circuit 95, 97 to the grid of the "A" trigger buffer amplifier tube 96. The trigger for the sweep of the "A" oscilloscope is taken at 99 from the cathode of tube 96. Another output may be taken at 101 from the anode of the tube 96 for a coarse ranging circuit.

The inputs to the third reference coincidence amplifier tube 90 are the 1000-yd. reference markers (to the control grid) and the gate from the grid of the second reference blocking oscillator 88 (to the suppressor grid). Coincidence will occur with the marker which follows the one causing coincidence in the second reference coincidence amplifier. The output of this tube is fed to the plate of tube 98.

The third reference blocking oscillator, tube 98, operates in exactly the same manner as the two preceding blocking oscillators. The output from the grid is used as the gate for the fourth reference coincidence amplifier tube 100. This is similar to the other three reference coincidence amplifiers, except for the plate circuit. A transformer, 102, serves as the plate load and the plate voltage is obtained through resistor 104, which is a dropping resistor for the plate voltage supply to the modulator trigger buffer amplifier tube 106. The by-pass capacitor 108 prevents any change in voltage at the junction of the plate circuits of tube 100 and tube 106 during the time that the large plate currents are drawn by these tubes. The secondary windings of transformer 102 are connected in series, with one end grounded and the other end connected to the grid of tube 106.

The modulator trigger buffer amplifier, tube 106 is connected as a cathode follower. The input to the grid is the positive signal from the transformer 102 and the output from the cathode is positive. This positive output is fed through a short time constant R. C. circuit 116, 117 and the peaked signal is applied to the grid of tube 110.

Tube 110 is a modulator trigger blocking oscillator tube, and provides sufficient signal across the 75 ohm cathode resistor, 112, to trigger the modulator. The input to this stage from tube 106 is applied to the grid through the grid winding of transformer 114, 114'. The grid return is to a negative voltage (say minus 30 volts) which keeps the tube cut off until the positive portion of the peaked input signal causes the grid to rise above the cut-off value. When the grid rises above cut-off, current flows through the plate winding 114' of the transformer, and induces a voltage in the grid winding 114 that further increases the grid voltage. This regenerative action continues until further increase in grid voltage no longer increases the plate current. When this happens, the field in the transformer collapses, causing the induced voltage in the grid winding to reverse polarity. This together with the charge on capacitor 116, drives the grid below cut-off. The output from this stage is taken across the cathode resistor 112, at terminal 118, and is used to trigger the modulator in the pulse transmitter.

While not essential to an understanding of the invention, it may be stated that in the particular circuit here described the two triodes for the Wien bridge oscillator 14 were the two halves of the double tube commercially designated as a 6SN7 tube. The tube 56 was a commercial 6AC7 tube. The tubes 62 and 66 were the two halves of a commercial 7F8 tube. The coincidence amplifier tubes 74, 84, 90 and 100 were all of the type commercially designated 6AC7. The tube 110, however, was a commercial 6AG7. The blocking oscillator triodes 78, 88, 98 and 106 were all halves of commercial 7F8 tubes. The same applies to the buffer amplifier tube 96 for the "A" oscilloscope. It will be understood that these commercial tube types are mentioned solely by way of exemplification, and not in limitation of the invention.

It is believed that the construction and operation, as well as the advantages of our improved synchronizing system, will be apparent from the foregoing detailed description. The main bangs have an average frequency determined by a repetition frequency oscillator or any desired external source, but the intervals between the successive main bangs are irregular rather than strictly periodic, and this makes it possible for a number of pulse-echo units to operate in the same vicinity without interfering with one another. The units may be given slightly different repetition frequencies, but that alone would not be enough to solve the problem. In the present case the repetition frequency produces a selector gate which itself selects the nearest marker pip of a crystal controlled oscillator, which provides accurate timing reference or range indication.

To summarize, a trigger selecting blocking oscillator fired at a desired frequency, say approximately 3 kilocycles, selects one out of a series of pips generated by a crystal controlled oscillator at, say 163.88 kilocycles. After appropriate delay, the resulting synchronizing trigger fires a gate for the sweep of an "A" oscilloscope or in other words provides the desired "A" trigger. It also provides a selector gate to select one or more succeeding thousand-yard pips for the modulator trigger. Thus the zero timing trigger and the pre-triggers are referred to and are locked in with the accurate timing base provided by the crystal oscillator. Moreover, a desired delay of one or more thousand yard pips may be provided between the "A" trigger and the modulator trigger for the main bang.

It will be understood that while we have described the invention in a preferred form, changes may be made in the circuits disclosed without departing from the spirit of the invention as sought to be defined in the following claims.

We claim:

1. Radio pulse echo range finding apparatus comprising, a nonsynchronous repetition rate oscillator, a first blocking oscillator for generating a first series of selector gate pulses at the repetition frequency, a crystal controlled oscillator for generating accurate range mark pips, a first coincidence circuit and second blocking oscillator being supplied with said first series of selector gate pulses and said crystal controlled pips for generating a first synchronizing trigger pulse and a second series of selector gate pulses, a second coincidence circuit and third blocking oscillator being supplied with said second series of selector gate pulses and with said crystal controlled pips for generating a second synchronizing trigger pulse more stable than said first trigger pulse, and transmitting means timed by said second trigger pulse.

2. Radio pulse echo range finding apparatus comprising, a nonsynchronous repetition rate oscillator, a first blocking oscillator for generating a first series of selector gate pulses at the repetition frequency, a crystal controlled oscillator for generating accurate range mark pips, a first coincidence circuit and second blocking oscillator being supplied with said first series of gate pulses and with the crystal controlled pips for generating a first synchronizing trigger pulse and a second series of selector gate pulses, a second coincidence circuit and third blocking oscillator being supplied with said second series of gate pulses and with said crystal controlled pips for generating a second synchronizing trigger pulse more stable than said first synchronizing trigger pulse, a cathode ray oscilloscope having a sweep wave circuit timed by said second trigger pulse, and a transmitter having a modulator timed under control of said second trigger pulse.

3. Radio pulse echo range finding apparatus comprising a nonsynchronous repetition rate oscillator, a first blocking oscillator for generating a first series of selector gate pulses at the repetition frequency, a crystal controlled oscillator for generating accurate range mark pips, a first coincidence circuit and a second blocking oscillator being supplied with said first series of selector gate pulses and said crystal controlled pips for generating a first synchronizing trigger pulse and a second series of selector gate pulses, a second coincidence circuit and a third blocking oscillator being supplied with said second series of selector gate pulses and with said crystal controlled pips for generating a second synchronizing trigger pulse and a third series of selector gate pulses, a third coincidence circuit and a fourth blocking oscillator being supplied with said third series of gate pulses and with said crystal controlled pips for generating a third synchronizing trigger pulse, a cathode ray oscilloscope having a sweep wave circuit timed by said second trigger pulse, and a transmitter having a modulator timed under control of said third trigger pulse.

4. Radio pulse echo range finding apparatus comprising a nonsynchronous repetition rate oscillator, a first blocking oscillator for generating a first series of selector gate pulses at the repetition frequency, a crystal controlled oscillator for generating accurate range mark pips, a first coincidence circuit and second blocking oscillator being supplied with said first series of selector gate pulses and said crystal controlled pips for generating a first synchronizing trigger pulse and a second series of selector gate pulses, a second coincidence circuit and third blocking oscillator being supplied with said second series of selector gate pulses and with said crystal controlled pips for generating a second synchronizing trigger pulse and a third series of selector gate pulses, a third coincidence circuit and fourth blocking oscillator being supplied with said third series of selector gate pulses and with said crystal controlled pips for generating a third synchronizing trigger pulse and a fourth series of selector gate pulses, a fourth coincidence circuit supplied with said fourth series of selector gate pulses and with said crystal controlled pips for generating a fourth synchronizing trigger pulse, a cathode ray oscilloscope having a sweep wave circuit timed by one of said trigger pulses, and a transmitter having a modulator timed by another of said trigger pulses.

5. Radio pulse echo range finding apparatus comprising a nonsynchronous repetition rate oscillator, a first blocking oscillator for generating a first series of selector gate pulses at the repetition frequency, a crystal controlled oscillator for generating accurate range mark pips, a first coincidence circuit and a second blocking oscillator being supplied with said first series of selector gate pulses and said crystal controlled pips for generating a first synchronizing trigger pulse and a second series of selector gate pulses, a second coincidence circuit and a third blocking oscillator being supplied with said second series of selector gate pulses and with said crystal controlled pips for generating a second synchronizing trigger pulse and a third series of selector gate pulses, a third coincidence circuit and a fourth blocking oscillator being supplied with said third series of gate pulses and with said crystal controlled pips for generating a third trigger pulse and a fourth series of selector gate pulses, a fourth coincidence circuit being supplied with said fourth series of selector gate pulses and with said crystal controlled pips for generating a fourth trigger pulse, a cathode ray oscilloscope having a sweep wave circuit timed by said second trigger pulse, and a transmitter having a modulator timed by said fourth trigger pulse.

6. Radio pulse echo range finding apparatus comprising, a nonsynchronous, variable repetition rate oscillator, means for generating a first series of selector gate pulses at said repetition rate, an accurate range mark generator, first means for combining said first series of selector gate pulses and said accurate range marks to generate a first trigger pulse in response to one of said range marks and one of said first series of selector gate pulses occurring in time coincidence, means responsive to the output of said first combining means for generating a second series of selector gate pulses, second means for combining said second series of selector gate pulses and said accurate range marks to generate a second trigger pulse in response to one of said range marks and one of said second series of selector gate pulses occurring in time coincidence, and utilization means timed in operation by said second trigger pulse.

7. Radio pulse echo range finding apparatus comprising, a nonsynchronous variable repetition rate oscillator, means for generating accurate range marks, means for generating a series of selector gate pulses at said repetition rate, a plurality of coincidence amplifier and blocking oscillator combinations in cascade, means for applying said accurate range marks in parallel to each of said coincidence amplifier and blocking oscillator combinations, means for applying said series of selector gate pulses to said plurality of coincidence amplifier and blocking oscillator combinations in series, and means for deriving an output trigger pulse from at least one of said plurality of coincidence amplifier and blocking oscillator combinations.

ROBERT I. HULSIZER.
GEORGE HITE.

References Cited in the file of this patent

UNITED STATES PATENTS

| Number | Name | Date |
|---|---|---|
| 2,405,238 | Seeley | Aug. 6, 1946 |
| 2,414,477 | Meacham | Jan. 21, 1947 |
| 2,426,216 | Hight | Aug. 26, 1947 |
| 2,484,352 | Miller et al. | Oct. 11, 1949 |